UNITED STATES PATENT OFFICE.

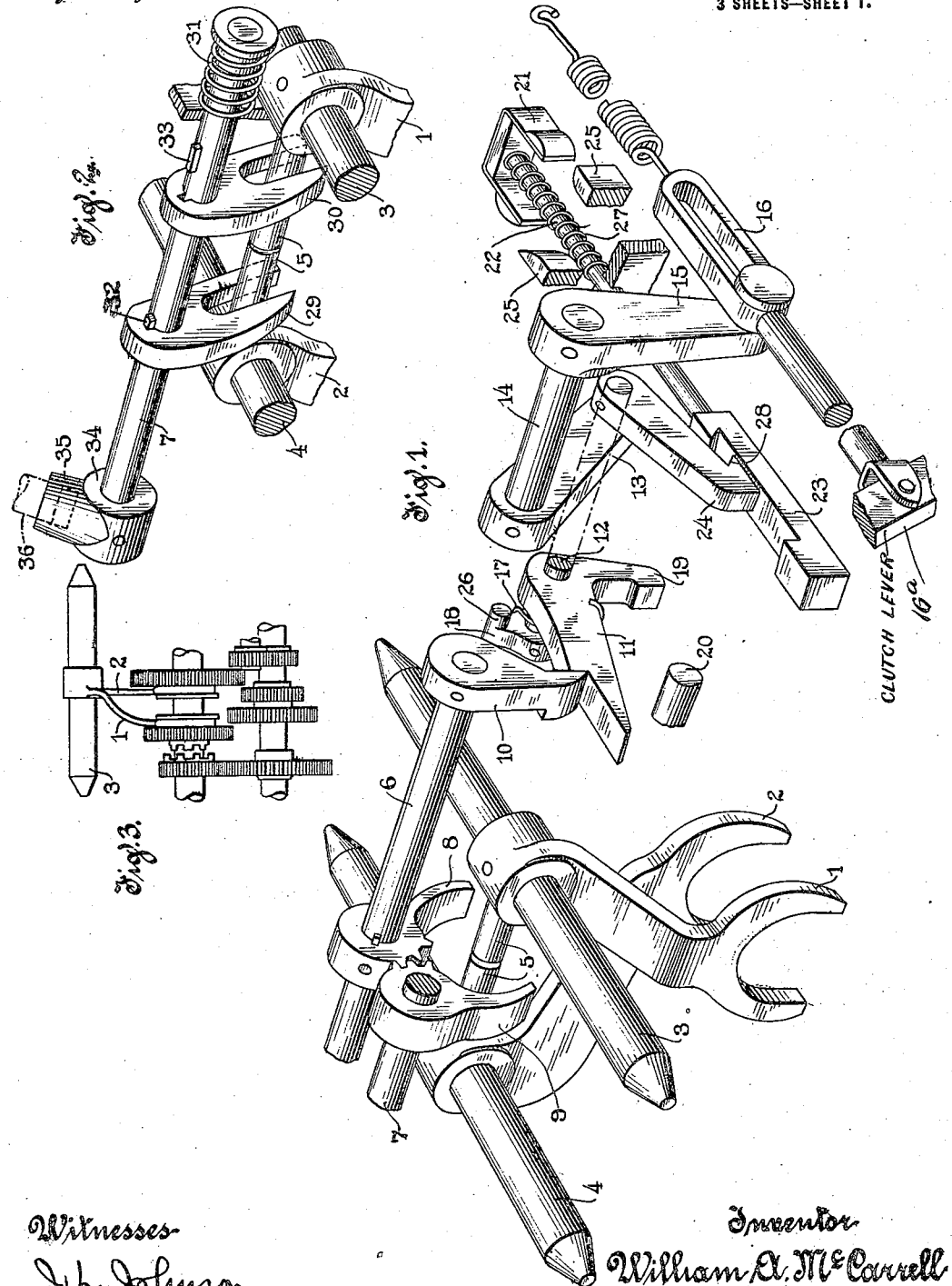

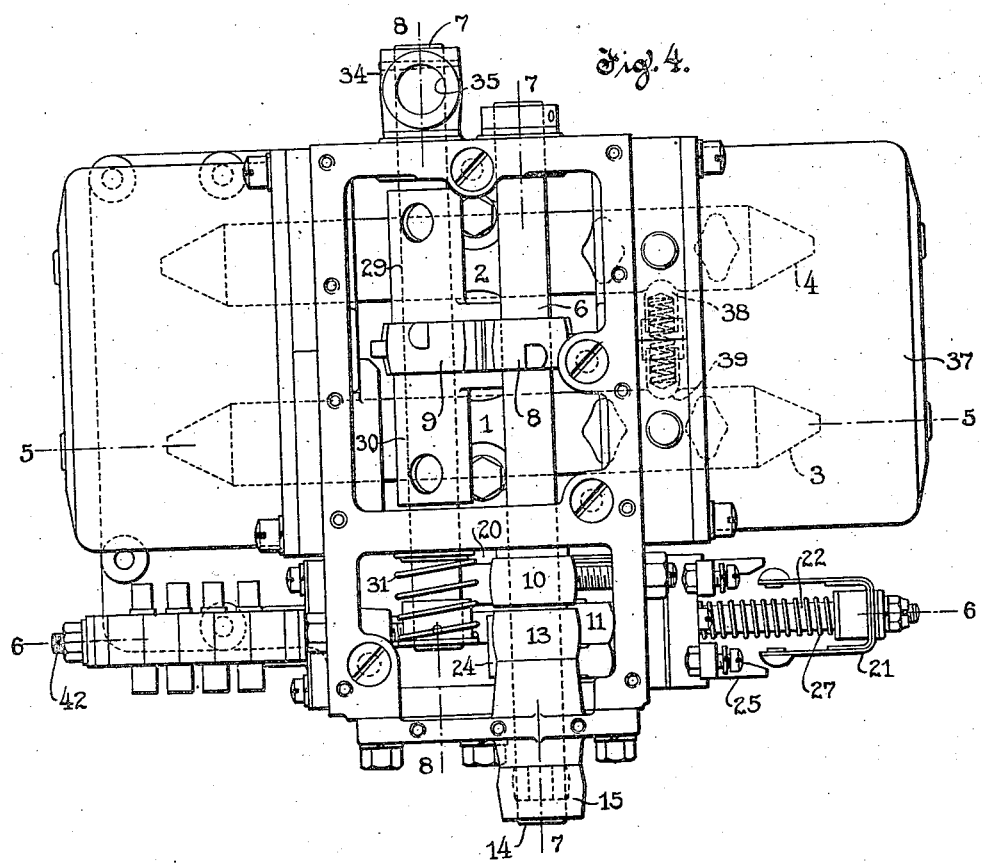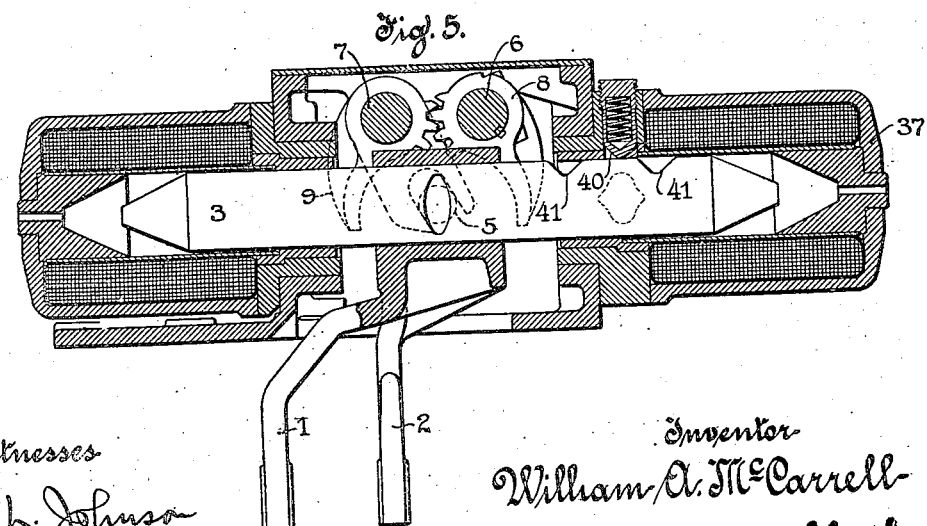

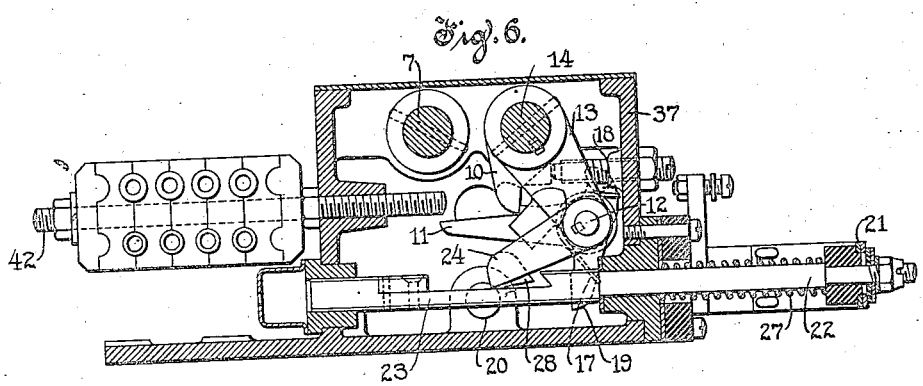
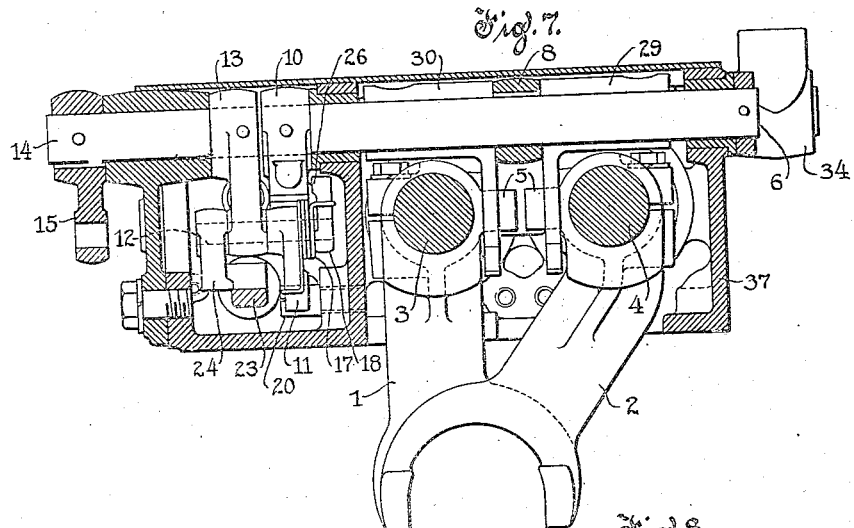
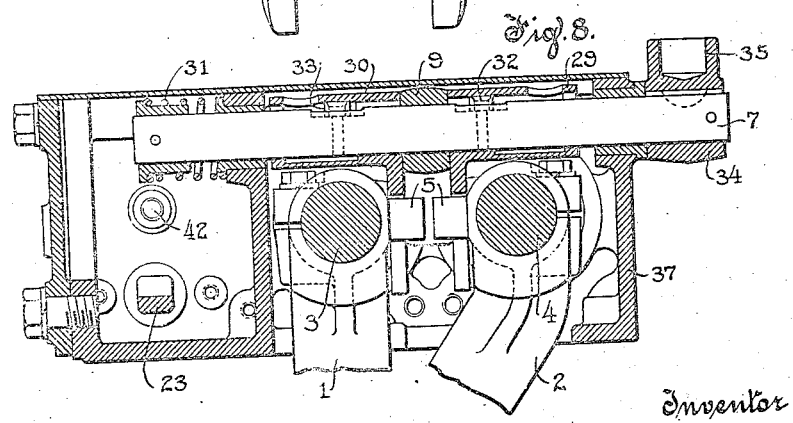

WILLIAM A. McCARRELL, OF MILWAUKEE, WISCONSIN, ASSIGNOR, BY MESNE ASSIGNMENTS, TO VULCAN MOTOR DEVICES COMPANY, OF PHILADELPHIA, PENNSYLVANIA, A CORPORATION OF PENNSYLVANIA.

GEAR-SHIFTING MECHANISM.

1,258,921.   Specification of Letters Patent.   Patented Mar. 12, 1918.

Application filed November 30, 1914.   Serial No. 874,695.

*To all whom it may concern:*

Be it known that I, WILLIAM A. McCARRELL, a citizen of the United States, residing at Milwaukee, in the county of Milwaukee and State of Wisconsin, have invented new and useful Improvements in Gear-Shifting Mechanism, of which the following is a full, clear, concise, and exact description, reference being had to the accompanying drawing, forming a part of this specification.

This invention relates to gear shifting devices.

More particularly the invention relates to automobile gear shifters and it has among its objects to provide a compact and efficient neutralizing mechanism.

A further object is to provide improved means for effecting neutral positioning of the gears prior to power shifting thereof and for terminating the power supply immediately after the selected shift has been effected thereby.

Another object is to provide improved means auxiliary to the power means, for enabling a manual change in the driving connection of the transmission gears in an emergency.

Various other objects and advantages will appear hereinafter in connection with a description of a preferred embodiment of the invention illustrated in the accompanying drawing, in which—

Figure 1 is a schematic view of a shifting mechanism for speed change gears.

Fig. 2 is a similar view of an auxiliary mechanism for manually effecting gear shifting.

Fig. 3 is a reduced schematic view of the shifting mechanism associated with speed change gears.

Fig. 4 is a top plan view of a mechanical embodiment of the means shown in Figs. 1 and 2.

Fig. 5 is a sectional view on the line 5—5 of Fig. 4.

Fig. 6 is a sectional view on the line 6—6 of Fig. 4.

Fig. 7 is a sectional view on the line 7—7 of Fig. 4, and

Fig. 8 is a sectional view on the line 8—8 of Fig. 4.

The mechanism illustrated is more particularly designed for effecting gear shifts in motor vehicles and operates in general to insure neutral positioning of all gears prior to each shift and to effect a selected shift only while the power drive through the gears is interrupted. As shown the mechanism is incorporated with an electro-responsive gear shifting device and a manually operated transmission clutch in an arrangement whereby the speed change gears are manually moved out of mesh by the operating lever of the clutch and thereafter moved to the desired meshing combination by the electro-responsive device, the circuit connections of the latter being predetermined by a manual selector and being established by means associated with the clutch operating lever.

Referring more specifically to Fig. 1, two gear shifting forks 1 and 2 are provided to be operatively connected in a suitable manner with the sliding elements of the transmission gearing to be controlled. These forks 1 and 2 are respectively provided with parallel operating rods 3 and 4 which constitute the cores of suitable solenoids and which, when attracted by the latter, serve to move the forks in either direction to effect any selected gear connection. The forks 1 and 2 are also provided with studs 5 projecting toward each other and positioned in alinement when all gears are in neutral position.

Two parallel shafts 6 and 7 extend transversely across the bars 3, 4 and have respectively thereon a fixed finger 8 and a loose finger 9 with segment gears in constant mesh so that the same rotate toward or away from each other simultaneously. The extremities of the fingers 8, 9 are disposed on opposite sides of the studs 5 and are adapted, when rotated toward each other, to engage said studs, if out of alinement, and draw the same into alinement whereby the gears are brought to neutral position. In practice this operation is effected through the conventional clutch lever or pedal when moved to "throw out" or disengage the clutch. For this purpose a depending lever 10 is fixed to the extremity of the shaft 6 in a position to be engaged and rotated clockwise by a pawl 11 loosely mounted on a short shaft 12 journaled through the extremity of a rocking arm 13 fixed to a rock shaft 14 which latter has a second fixed arm 15 having a lost-motion connection at its free end with a link 16 connected to the clutch lever 16ª of the vehicle. The amount of lost motion between said link and the arm 15 is such that disengagement of the clutch is completed before the lever 15 and the associated parts are moved. The pawl 11 is biased toward the lever 10 by a spring 17 on shaft 12 and having its ends bearing against said pawl and a collar 18 which is keyed to said shaft 12.

With the connections described movement of the lever 15 upon disengagement of the clutch turns the rock shaft 14 and rocking lever 13 in a clockwise direction whereby the shaft 12 and pawl 11 are carried in the same direction about shaft 14 as an axis. The pawl 11 thus turns the lever 10 causing the shaft 6 to rotate and draw together the fingers 8 and 9 for neutralizing the gears as above set forth. At the moment this operation is completed the pawl 11 will have reached a position where an offset lug 19 thereof abuts a fixed stop 20. Thus continued movement of the clutch lever causes the pawl to be tripped and to release the lever 10 whereby the connection between the transmission gearing and the clutch pedal is interrupted and the former freed for selective operation.

As above mentioned, electro-responsive devices comprising the cores 3, 4 and solenoid windings therefor are employed to effect movement of the gears to mesh and a normally open switch 21 operated by the clutch lever is provided to complete circuit to the selected solenoid winding. This switch has a reciprocable operating rod 22 with a notched extremity 23 affording shoulders to be engaged by an operating pawl 24 keyed to the shaft 12. The pawl 24, as is apparent, moves forwardly with the pawl 11 in neutralizing, and the same is arranged to engage the end wall of the notch 23 on the switch rod 22, immediately after tripping of the pawl 11. Thus continued movement of the clutch lever and pawl 24 moves the rod 22 to close the switch 21 for completing circuit across suitable stationary contacts 25. The selected operating solenoid is thereupon energized and one of the cores 3, 4 is attracted to move the selected gear, thereby carrying its stud 5 against one of the fingers 8, 9 to spread the same. The shaft 6 is thereby rotated counter-clockwise and turns the lever 10 therewith until the same strikes an offset lug 26 on the collar 18 keyed to the shaft 12. Said collar and shaft are thus also rotated, but in a clockwise direction, so that the pawl 24 is raised and tripped from its engagement with the switch rod 22. The switch 21 thereupon opens in response to suitable biasing means such as a spring 27, whereby, after shifting of the selected gear has been effected, the power supply is immediately terminated irrespective of the position of the clutch lever. It is of course to be understood that the sequence of operation above described requires but a very short period. In fact, the gear change from one speed to neutral and to the selected speed is accomplished during a single quick depression of the clutch lever. It is also to be understood that the mechanical clutch may be disengaged and reëngaged when desired without affecting the speed change gears due to the lost motion connection of the link 16.

While the circuit connection to the operating solenoid winding is automatically interrupted upon predetermined attraction of either of the operating cores 3, 4 as above set forth, there is also preferably provided means for positively opening the switch 21 in the event that the latter should stick against the action of the spring 27. As shown this means comprises a shoulder 28 on the switch operating pawl 24 which engages the inner shoulder of the notch 23 on the switch rod when the clutch lever is released in case the switch has not previously opened.

The mechanism illustrated in Fig. 2 is an auxiliary device whereby the gears may be shifted manually if necessary, for example, in the event of failure of the source of energy. As shown the shaft 7 is journaled both for rotation and axial movement and is provided with a pair of forks 29 and 30, (on opposite sides of the finger 9) each of which straddles one of the studs 5 on the gear shifters 1, 2. A spring 31 biases the shaft to normal position in which the fork 29 is keyed to said shaft by a feather 32 while the fork 30 is loose. However, axial movement of the shaft against the action of spring 31 at the same time frees the fork 29 and keys the fork 30 by a feather 33. A fitting 34 is fixed to the extremity of the shaft 7 and is provided with a recess 35 to receive a hand lever 36 by which the shaft 7 may be operated manually. For example, manual rotation of said shaft moves the gear shifter 2 through the medium of the fork 29 which engages the left stud 5 to thereby establish either of two driving connections through the speed change gears, such as first speed forward or reverse. When it is desired to move the shifter 1 to establish either of two other driving connections, such as second and third speeds forward, the shaft 7 is moved axially by the operating lever 36 to release finger 29 from its feather 32 and to key the finger 30 to the shaft by its feather 33. Thereupon rotation of said shaft operates shifter 1 through the medium of finger 30 and the right stud 5. While the described means for effecting manual gear shifts is designed as ancillary to the power shifting means yet the same is obviously of advantage for emergency use, and moreover, does not affect nor complicate the remainder of the mechanism.

Figs. 4 to 8 illustrate a preferred working structure of the device described. A casing 37 is provided to house and support the solenoid winding arranged compactly in pairs at each end. The shafts 6, 7 extend transversely of the casing and are journaled in opposite walls of the same. The rock shaft 14 is journaled through the outside end wall of the supporting frame and the switch rod 22 likewise extends therethrough. In practice the tripping device 20 for the neutralizing pawl 11 is an offset lug on the casing. It is to be noted that the rocking arms 10 and 13 and the pawls 11 and 24 are closely adjacent and occupy but very little space.

Means is provided to insure against simultaneous movement of the two shifter operating rods 3, 4 so that improper meshing of the gears and consequent damage is rendered impossible. The means shown to accomplish this result comprises a double ended detent 38 in the casing intermediate the operating rods and having its ends biased apart to rest in recesses 39 in said rods when the gears are in neutral position. The length of the two end members of the detent is such that when either rod is moved the lost motion between said ends is taken up and the unmoved rod is accordingly locked against reciprocation. Spring detents 40 are also provided to resiliently entents 40 are also provided to resiliently engage notches 41 in the operating rods for holding the latter against movement after the driving connection is established through the gears.

A terminal box for the circuit connections of the various solenoid windings is attached to the end of the frame 37 opposite the switch 21. This box is supported on an adjustable bolt 42 having its extremity extending through the casing and constituting an abutment in the path of the rocking arm 13 to insure against inward movement of the switch rod 22 beyond a predetermined limit. The fitting 34 to receive the emergency hand lever 36 is disposed without one end wall of the casing and in a position accessible from thereabove.

What I claim as new and desire to secure by Letters Patent is:—

1. In a device of the character described, in combination, speed change gears, shifters therefor, axially offset pivoted members to move said shifters for neutralizing said gears, means including a pawl to rotate said members, foot operated means to move said pawl, and means to trip said pawl for freeing said shifters upon movement of said foot operated means to a predetermined degree.

2. In a device of the character described, in combination, speed change gears, shifters therefor having portions disposed in a predetermined relation when said gears are in neutral, rotatable members to engage and draw said shifter portions to said predetermined relation, a pawl to rotate said members, foot operated means to move said pawl, and means to trip said pawl for freeing said shifters upon a definite movement of the former means.

3. In a device of the character described, in combination, speed change gears, shifters therefor having portions disposed in a predetermined relation when said gears are in neutral, a pair of interlocked rotatable members to engage and draw said shifter portions to said predetermined relation, a bodily movable pawl to rotate one of said members, foot operated means to move said pawl, and means to trip said pawl for freeing said shifters upon predetermined movement of said foot operated means.

4. In a device of the character described, in combination, speed change gears, shifters therefor having portions positioned in alinement when said gears are in neutral, a pair of members movable toward each other to engage and aline said shifter portions, and operating means for said members.

5. In a device of the character described, in combination, speed change gears, shifters therefor having offset portions projecting toward each other and positioned in alinement when said gears are in neutral, a pair of members embracing said portions and movable together for alining the same, and operating means for said members.

6. In a device of the character described, in combination, two reciprocable gear shifters movable in parallel paths and having parts positioned in alinement for a predetermined relation of said shifters, a pair of pivoted members interlocked to rotate in opposite directions and disposed on opposite sides of said shifter parts, and foot operated means for rotating said members toward each other to thereby aline said shifter parts.

7. In a device of the character described, in combination, speed change gears, shifters therefor, and means for neutralizing said gears including a pair of eccentrically pivoted members movable together to engage and move said shifters.

8. In a device of the character described, in combination, speed change gears, shifters therefor and means for neutralizing said gears including a pair of eccentrically pivoted members interlocked to rotate simultaneously and adapted to engage and move said shifters.

9. In a device of the character described, in combination, speed change gears, parallel reciprocable shifters therefor, and means for neutralizing said gears including a pair of rotatable members having toothed portions in mesh for insuring simultaneous rotation of said members in opposite directions and having lever portions to engage said shifters.

10. In a device of the character described, in combination, speed change gears, shifters therefor having offset portions, a pair of members disposed on opposite sides of said portions and movable toward each other for drawing said portions together, and foot operated means for moving said members together.

11. In a device of the character described, in combination, speed change gears, shifters therefor having offset portions, a pair of members disposed on opposite sides of said portions and movable toward each other for drawing said portions together, and foot operated means for moving said members together and means to free said members from said means upon movement of the former by the latter.

12. In a device of the character described, in combination, speed change gears, parallel shifters therefor having offset portions projecting toward each other, a pair of members on opposite sides of said offset portions, each of said members being movable to engage and move both of said portions in one direction, and operating means for said members.

13. In a device of the character described, in combination, speed change gears, shifters therefor, and means for neutralizing said gears including two interlocked pivoted members, each adapted to engage and move said shifters in one direction.

14. In a device of the character described, in combination, speed change gears, shifters therefor, and means for neutralizing said gears including two interlocked members each adapted to engage and move said shifters in one direction and to be moved by the same in another direction.

15. In a device of the character described, in combination, speed change gears, shifters therefor having offset portions, a pair of members disposed on opposite sides of said portions and movable toward each other for drawing the same together, and foot operated means for moving said members toward each other, said members being movable apart by said shifters independently of said means.

16. In a device of the character described, in combination, speed change gears, shifters therefor having offset portions projecting toward each other and positioned in alinement when said gears are in neutral, a pair of interlocked rotatable members to engage and aline said offset portions when rotated together, and operating means for rotating said members together, said members being rotated apart by said shifters independently of said means.

17. In a device of the character described, in combination, speed change gears, shifters therefor having offset portions positioned in alinement when said gears are in neutral, and a pair of eccentrically pivoted members interlocked to rotate in opposite directions, said members engaging and alining said offset portions when rotated toward each other and being engaged and separated by said offset portions when said shifters are moved from neutral position.

18. In a device of the character described, in combination, speed change gears, shifters therefor, operating members for said shifters, a foot operated crank lever having a pivoted pawl movable to actuate said operating members for neutralizing said gears, and means to trip said pawl for freeing said gears upon predetermined partial movement of said crank lever.

19. In a device of the character described, in combination, speed change gears, a pair of reciprocable shifters therefor, a pair of shafts extending transversely of said shifters, pivoted operating members for said shifters arranged on said shafts, a foot operated crank lever having a pawl to rotate said members for neutralizing said gears, and means to trip said pawl for freeing said gears upon a predetermined movement of said crank lever.

20. In a device of the character described, in combination, speed change gears, a pair of reciprocable shifters therefor having offset portions positioned in alinement when said gears are in neutral, a pair of shafts extending transversely of said shifters, a fixed member on one of said shafts, a loose member on the other, said members being interlocked to rotate together for engaging and alining said offset shifter portions, a lever interlocked to rotate with one of said members, a foot operated crank lever having a pivoted pawl to engage and rotate said first mentioned lever, and a stop to trip said pawl for freeing said gears upon a predetermined movement of said crank lever.

21. In a device of the character described, in combination, speed change gears, shifters therefor, power devices for moving said shifters to effect driving connection of said gears, means controlling the action of said power devices, means for moving said shifters to position said gears in neutral, and a common operating member for the two aforesaid means, said second mentioned means being operable by said shifters when moved by said power devices for causing said first mentioned means to terminate the action of said power devices.

22. In a device of the character set forth, in combination, speed change gears, electro-responsive shifting means therefor to effect driving connection thereof, foot operated control means to energize said electro-responsive means, and means tending to effect immediate deënergization of said electro-responsive means by said control means upon establishment of driving connections of said gears.

23. In a device of the character described, in combination, speed change gears, shifters therefor, means to move said shifters for neutralizing said gears, power devices to move said shifters for effecting a driving connection of said gears, a member controlling said power devices, an operating pawl for said means, an operating pawl for said member, and common operating means for said pawls.

24. In a device of the character described, in combination, speed change gears, shifters therefor, means to move said shifters for neutralizing said gears, power devices to move said shifters for effecting a driving connection of said gears, a member controlling said power devices, an operating pawl for said means, an operating pawl for said member, common operating means for said pawls, and means to trip said first mentioned pawl for freeing said shifters before actuation of said member by said second mentioned pawl.

25. In a device of the character described, in combination, speed change gears, shifters therefor, means to move said shifters for neutralizing said gears, power devices to move said shifters for effecting a driving connection of said gears, a member controlling said power devices, a pawl movable in one direction for operating said means, a second pawl movable in the same direction to operate said member, and operating means for said pawls.

26. In a device of the character described, in combination, speed change gears, shifters therefor, means to move said shifters for neutralizing said gears, power devices to move said shifters for effecting a driving connection of said gears, a member controlling said power devices, a pawl movable in one direction for operating said means, a second pawl movable in the same direction to operate said member, common operating means for said pawls, and means to trip said first mentioned pawl for freeing said shifters before operation of said member by said second mentioned pawl.

27. In a device of the character described, in combination, speed change gears, shifters therefor, means to move said shifters for neutralizing said gears, power devices to effecting a driving move said shifters for effecting a driving connection of said gears, a bodily movable operating member for said means, a movable operating member for controlling said devices, and means to trip said first mentioned member for freeing said shifters independently of the position of said second mentioned member.

28. In a device of the character described, in combination, speed change gears, shifters therefor, rotatable members to move said shifters for neutralizing said gears, power devices to move said shifters for effecting driving connection of said gears, a member controlling said power devices, a bodily movable pawl to rotate said members, a pawl bodily movable in the same direction to operate said second mentioned member, common operating means for said pawls, and means to trip said first mentioned pawl for freeing said shifters before operation of said second mentioned member by said second mentioned pawl.

29. In a device of the character described, in combination, speed change gears, shifters therefor, rotatable members to move said shifters for neutralizing said gears, power devices to move said shifters for effecting driving connection of said gears, a member controlling said power devices, a bodily movable pawl to rotate said members, a pawl bodily movable in the same direction to operate said second mentioned member, common operating means for said pawls, means to trip said first mentioned pawl for freeing said shifters before operation of said second mentioned member by said second mentioned pawl, and means to trip said second mentioned pawl upon actuation of said shifters by said power devices independently of the position of said first mentioned pawl.

30. In a device of the character described, in combination, speed change gears, shifters therefor having offset portions positioned in alinement when said gears are in neutral, foot operated means to engage and aline said offset portions, and hand operated means to engage and move said portions independently of said foot operated means.

31. In a device of the character described, in combination, speed change gears, shifters therefor having offset portions positioned in alinement when said gears are in neutral, foot operated means to engage and aline said offset portions, and hand operated means to engage and selectively move said portions out of alinement.

32. In a device of the character described, in combination, speed change gears, shifters therefor having offset portions projecting toward each other and positioned in alinement when said gears are in neutral, parallel shafts extending transversely of said shifters, a pair of interlocked rotatable members on said shafts embracing said offset portions and movable together for alining the same, a pair of forked levers on one of said shafts movable independently of said members, each of said levers engaging one of said offset portions and being adapted to move the same, and means for selectively locking said levers to said shaft supporting the same.

33. In a device of the character described, in combination, speed change gears, electro-responsive devices to move the same, a normally open switch controlling circuit to said devices, a member movable in one direction to close said switch, and means to trip said member upon movement of said gears by said devices, said member also insuring positive opening of said switch upon reverse movement.

34. In a device of the character described, in combination, speed change gears, an electro-responsive device to move the same, a switch controlling circuit to said device, means biasing said switch to open position, foot operated means movable in one direction to close said switch, and means to trip said foot operated means upon movement of said gears by said device, said foot operated means also acting to positively open said switch upon failure of the same to open in response to said biasing means.

35. In a device of the character described, in combination, speed change gears, an electro-responsive device to move the same, a normally open switch controlling circuit to said device, a foot operated pawl movable in one direction to close said switch, and means to trip said pawl on movement of said gears by said device, said pawl also acting when moved in a reverse direction to positively open said switch.

36. In combination, speed change transmission gears, a clutch device controlling power transmission thereto, electro-responsive devices for shifting said gears, foot operated means for actuating said clutch device and effecting energization of said electro-responsive devices, and means tending to effect deënergization of said electro-responsive devices upon gear shifting thereby, said foot operated means being also operable to insure deënergization of said electro-responsive devices independently of said second mentioned means.

37. In combination, speed change gears, a clutch actuating member to control the power transmission thereto, neutralizing means for said gears, and a lost motion connection between said clutch actuating member and said neutralizing means providing for actuation of the latter by the former and for actuation of the former independently of the latter for clutch release.

38. In combination, speed change gears, a clutch actuating member to control the power transmission thereto, power operated shifting means for said gears, means for neutralizing said shifting means and said gears and a lost motion connection between said clutch actuating member and said neutralizing means providing for actuation of the latter by the former while permitting actuation of the former independently of the latter for clutch release.

39. In combination, speed change gears, a clutch device controlling power transmission thereto, means mechanically actuated by the operating member of said clutch device for positioning said gears in neutral relation after the power transmission thereto has been interrupted, electro-responsive means controlled by said clutch operating means and operable only after the neutral positioning of said gears for effecting driving connection thereof, and manually operable means for effecting driving connection of said gears independently of said electro-responsive devices.

40. In a device of the character described, in combination, speed change gears, means for neutralizing the same, electro-responsive means for effecting a driving connection between said gears, controlling means for said electro-responsive means and common operating means for said neutralizing and controlling means having a trip connection with each.

41. In a device of the character described, in combination, speed change gears neutralizing means therefor, electro-responsive means for effecting a driving connection through said gears, means controlling the energization of said electro-responsive means, and common operating means for said neutralizing and controlling means having a trip connection with each, the tripping of said connections being effected successively and the tripping of one connection being dependent upon that of the other.

42. In combination, speed change gears, a clutch device controlling the power transmission thereto, operating means for said clutch device, means including a tripping device actuated by said operating means for positioning said gears in neutral relation after the interruption of the power transmission thereto, a lost motion connection between said operating means and said neutralizing means, electro-responsive means for effecting a driving connection of said means, means for energizing said electro-responsive means but only after action of said tripping device and means tending upon establishment of driving connection of said gears to render said energizing means ineffective.

In witness whereof, I have hereunto subscribed my name in the presence of two witnesses.

WILLIAM A. McCARRELL.

Witnesses:
H. WATSON,
TEKLA BAST.